C. A. HANSEN.
CARBON ARTICLE.
APPLICATION FILED NOV. 16, 1909.

1,037,901.

Patented Sept. 10, 1912.

WITNESSES:
J. Earl Ryan.
J. Ellis Glen

INVENTOR:
CHARLES A. HANSEN,
BY Albert G. Davis
His Attorney

UNITED STATES PATENT OFFICE.

CHARLES A. HANSEN, OF SCHENECTADY, NEW YORK, ASSIGNOR TO GENERAL ELECTRIC COMPANY, A CORPORATION OF NEW YORK.

CARBON ARTICLE.

1,037,901. Specification of Letters Patent. Patented Sept. 10, 1912.

Application filed November 16, 1909. Serial No. 528,424.

*To all whom it may concern:*

Be it known that I, CHARLES A. HANSEN, a citizen of the United States, residing at Schenectady, in the county of Schenectady, State of New York, have invented certain new and useful Improvements in Carbon Articles, of which the following is a specification.

My invention relates to the production of carbon articles having increased density and mechanical strength and high electrical conductivity, which are especially suitable for use in the electrical arts, as brushes, electrodes and the like.

My invention involves a process for making these improved carbon articles by impregnating a previously formed article with a suitable carbonaceous material, while said article is in a porous and not fully shrunk condition, and then firing the same at a higher temperature so as not only to carbonize the impregnating material, but to further shrink the carbon article.

My invention will be pointed out with greater particularity in the appended claims.

Figure 1:
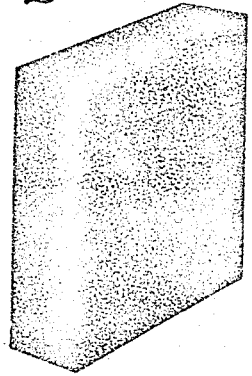
Figure 2:
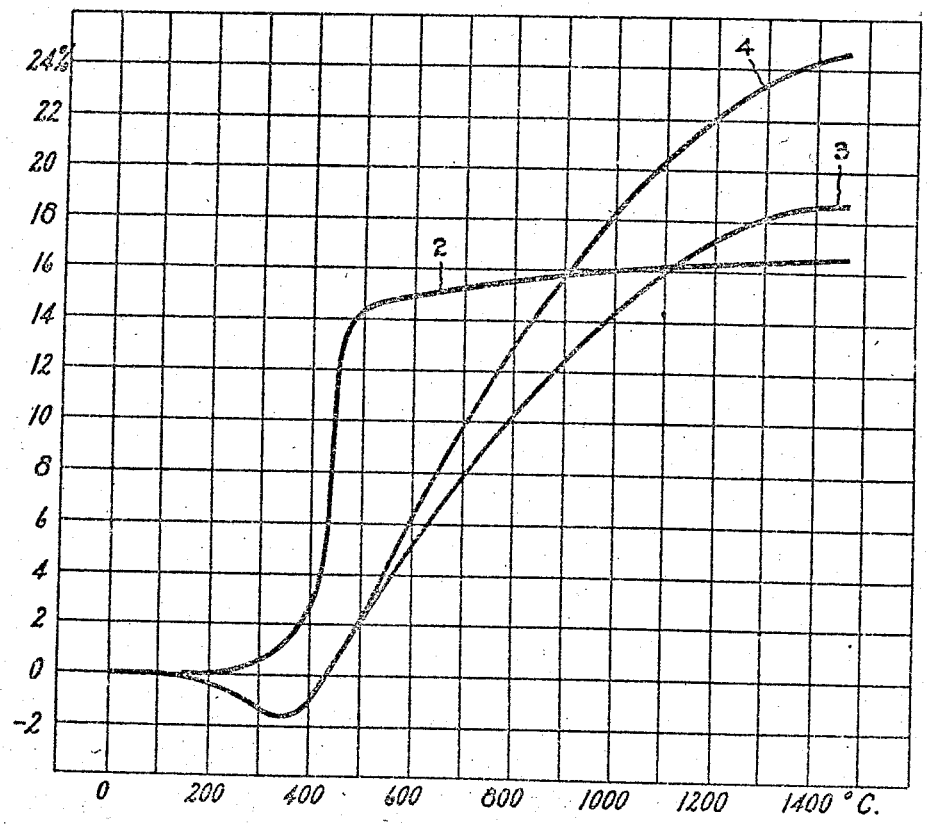

In the accompanying drawing Figure 1 shows a formed carbon article; and Fig. 2 shows by means of curves the relative rate of loss of volatile matter and shrinkage of the carbon articles at different temperatures.

Artificial carbons, for brevity's sake, let us say, brushes for dynamo-electric machines, as represented in Fig. 1, are commonly made by compacting some form of carbon, such as powdered coke, graphite, lamp black and the like, or a mixture of these materials with a suitable carbonizable binder, as tar or pitch. For example, according to one process of manufacture, the pulverized carbon with a pitch binder, are ground together in a liquid solvent for the binder, such as benzol. This treatment thoroughly distributes the binder through the mass. The benzol is then driven off, the caked mass is again pulverized and is then ready for molding into desired form, as by pressing or squirting. The formed brushes are finally fired to carbonize and set the binder.

The carbonizing treatment volatilizes some of the constituents of the green brush, and makes it somewhat porous. In order to render the fired brush denser, stronger and more conductive, it may be impregnated with organic substances, as tar or pitch, and then fired again so as to introduce into its pores the carbon remaining from the impregnating material.

Modern electrical practice with its higher speeds, heavier currents, and higher voltages has made the usage to which brushes are subjected more severe than was formerly the case, so that brushes which were formerly satisfactory no longer meet the demands of the electrical industry. Stronger and more conductive brushes are required. I find that a better article can be made by carrying on the manufacture of brushes by an improved process which can be best understood by first considering certain phenomena involved therein.

I have discovered that when an unbaked brush known as a green brush is subjected to progressively higher temperature, the volatile matter is almost completely expelled in the neighborhood of 400—500° C. The loss at different temperatures is indicated by curve 2 in Fig. 2. The abscissæ are plotted in units of temperature and the ordinates in units of per cent. loss of weight, or per cent. cubical shrinkage of an average brush. It will be observed that the curve becomes nearly vertical between 400° and 500°, indicating that the loss of weight by volatilization is very high in this region of temperature. At 600° nearly all of the volatile matter has been expelled. At higher temperatures the curve has a very gradual slope. Secondly, I have found that as the brush is subjected to a heat treatment it also changes in volume; at first it usually expands somewhat, and then shrinks. At about 450° C. its volume is about the same as before heating and as the temperature rises steady shrinkage continues. The shrinkage at different temperatures is indicated by curve 3. These curves indicate results obtained with a mixture of lamp black, coke (unfired), graphite, and a pitch binder. The form of the curves will vary somewhat with the particular mixture and the grade of materials employed.

It will be observed that between 450 and 500° C. the brush has shrunk but slightly, and as at these temperatures the maximum loss of volatile matter has taken place, the brush will be in a very porous condition. In general this maximum loss of volatile matter will take place between temperatures of about 400 and 600° C.

In carrying my invention into effect I prefer to proceed as follows: I take a green carbonaceous brush consisting for example of coke, graphite and lamp-black with a carbonizable binder such as pitch made by the process described in the Saunders Patent #598,646, and fire it at a temperature at somewhere between 400 degrees to 600 degrees C., preferably at about 480 degrees C. The preliminary firing or baking of the green carbon article can be carried out in any suitable furnace, but preferably an electrically heated muffle is employed as its temperature can be controlled with accuracy by the use of a rheostat or other electrical means. The temperature is brought up to about 480 degrees C. at which point it is maintained for about ten hours. Upon cooling the carbons are placed in a large mesh wire basket and immersed in some liquid carbonizable material such as hot tar or pitch. They are allowed to remain in this bath until the impregnated material has thoroughly penetrated through the pores of the carbons, the time of impregnation depending upon their size and the character of the impregnating material. Ordinarily the carbons remain in the impregnating bath about sixty hours, the bath being at a temperature of about 130–180° C. I find that pitch gives the best results as an impregnant. After removal from the impregnating bath the carbons are drained. The brush is subsequently fired to a high temperature, say, at a temperature of 1200 to 1400 degrees C. The firing may take place in a suitable kiln, such as an ordinary porcelain kiln. The particular final firing temperature will depend somewhat upon the properties desired in the finished carbon. At a firing temperature above 1400 degrees C. the conductivity increases but the tensile strength decreases.

By firing, or as I prefer to say, baking, the brush, or other carbon article, at the relatively low temperature of about 480° C., then impregnating and finally firing the same at a higher temperature, I gain the following advantageous results; first, the carbon residue from the carbonization of the pitch is deposited in the pores of the brush and the body of the brush is then shrunk upon it; secondly, I find that the shrinkage of the brush when impregnated in this manner is greater than when unimpregnated. In fact, if a brush has been fired at a high temperature, say 1400° C., is then impregnated and fired again, it will shrink an additional amount, but not to as great an extent as if baked at a moderate temperature, thereupon impregnated and finally fired at a higher temperature. For example, the cubical shrinkage of an unimpregnated carbon after firing to a temperature of about 1400° C. is about 18.3 per cent.; when impregnated after firing at this temperature and then refired its shrinkage is about 21.7 per cent., and when baked at about 480° C., then impregnated and finally fired at about 1400° C. its shrinkage is about 24.3 per cent. The amount of contraction which an impregnated brush or other carbon article undergoes at different temperatures is indicated by curve 4.

The following specific examples of the effect of impregnation on carbon articles will serve to more fully illustrate the advantages resulting from my invention:

1. An unimpregnated carbon brush after being fired at a temperature of 1300 to 1400 degrees has the following characteristics:

Apparent density _____ 1.425
Absolute density _____ 2.05
Porosity _____ 30.5%
Resistance _____ .00163 ohms per inch cube
Tensile strength _____ 800 lbs. per sq. inch 2. A carbon brush fired to a temperature of about 1400 degrees C., then impregnated and fired again has the following characteristics:

Apparent density _____ 1.54
Absolute density _____ 2.05
Porosity _____ 28.8%
Resistance _____ .00137 ohms per inch cube
Tensile strength _____ 1420 lbs. per sq. inch 3. A carbon baked at a temperature of 480° C., then impregnated with pitch and finally fired at a temperature of 1300 to 1400 degrees has the following characteristics:

Apparent density _____ 1.66
Absolute density _____ 2.05
Porosity _____ 19%
Resistance _____ .00108 ohms per inch cube
Tensile strength _____ 2130 lbs. per sq. inch An inspection of the above figures, which represent the characteristics of average brushes obtained by the treatments indicated, makes the decrease in porosity and resistance and the increase in tensile strength apparent.

It will, of course, be understood that my invention is not limited to the manufacture of brushes, but is equally applicable to the production of electrodes and other carbon articles, and it is likewise not limited to any particular mixture of carbonaceous material or the process of mixing and molding the same.

What I claim as new and desire to secure by Letters Patent of the United States, is

1. The process which consists in molding a carbonaceous article, baking said article at a temperature sufficient to drive off part of the volatile matter, impregnating said article with organic matter, and then firing to a higher temperature.

2. The process which consists in firing a previously formed carbonaceous article at a temperature sufficiently high to drive off a large part of the volatile matter, but insufficient to shrink said carbonaceous article to its final density, impregnating said article with carbonaceous material and then firing at a higher temperature.

3. The process which consists in subjecting a previously formed green carbon article to a heat treatment at a temperature sufficient to remove most of the volatile matter contained therein without materially shrinking said article, impregnating said article with carbonaceous material and then firing at a temperature in excess of 1200° C.

4. The process which consists in baking a green carbon article at a temperature below 600° C. until most of the volatile matter has been expelled, impregnating said article with a carbonaceous material, and then firing the impregnated article at a higher temperature at which considerable shrinkage will take place.

5. The process of making carbon articles, which consists in compacting powdered carbon and a carbonaceous binder, baking at a temperature sufficient to expel a part of the volatile matter, impregnating the article with a material yielding a carbonaceous residue and then firing the article at a considerably higher temperature.

6. The process which consists in subjecting a previously formed carbon article to a temperature of about 400° to 600° C., impregnating said article with carbonaceous material and then firing said article at a temperature of 1200 to 1450° C.

7. The process which consists in baking a green carbon brush at a temperature of about 400° to 600° C., impregnating said brush with pitch and then firing said impregnated brush at a temperature of about 1400° C.

8. The process which consists in subjecting a green carbon article to a baking treatment at a temperature between 450° to 550° C., impregnating said baked article with carbonaceous material and then firing the impregnated article at a materially higher temperature.

9. The process of making carbon articles, which consists in compacting powdered carbon and a carbonaceous binder, baking the formed article at a temperature of about 480° C., impregnating the baked article with pitch and then firing at a temperature of about 1400° C.

In witness whereof, I have hereunto set my hand this 15th day of November, 1909.

CHARLES A. HANSEN.

Witnesses:
BENJAMIN B. HULL,
HELEN ORFORD.